United States Patent
Killingsworth

(10) Patent No.: US 12,545,403 B2
(45) Date of Patent: Feb. 10, 2026

(54) INVERTED V-TAIL STABILIZER ASSEMBLY FOR AN AIRCRAFT

(71) Applicant: Textron eAviation Inc., Wichita, KS (US)

(72) Inventor: Sean Michael Killingsworth, Wichita, KS (US)

(73) Assignee: Textron eAviation Inc., Providence, RI (US)

( * ) Notice: Subject to any disclaimer, the term of this patent is extended or adjusted under 35 U.S.C. 154(b) by 20 days.

(21) Appl. No.: 18/506,001

(22) Filed: Nov. 9, 2023

(65) Prior Publication Data

US 2024/0158079 A1 May 16, 2024

Related U.S. Application Data

(60) Provisional application No. 63/383,423, filed on Nov. 11, 2022.

(51) Int. Cl.
| | |
|---|---|
| *B64C 39/04* | (2006.01) |
| *B64C 1/26* | (2006.01) |
| *B64C 5/02* | (2006.01) |

(52) U.S. Cl.
CPC ............... *B64C 39/04* (2013.01); *B64C 1/26* (2013.01); *B64C 5/02* (2013.01)

(58) Field of Classification Search
CPC .............. B64C 39/04; B64C 1/26; B64C 5/02
See application file for complete search history.

(56) References Cited

U.S. PATENT DOCUMENTS

| | | | |
|---|---|---|---|
| 10,023,294 B2 | 7/2018 | Vanbuskirk et al. | |
| 11,319,055 B2 | 5/2022 | Decker et al. | |
| 2005/0242236 A1* | 11/2005 | Purcell, Jr. ................ | B64C 3/56 244/87 |
| 2016/0052619 A1 | 2/2016 | Gagliano | |
| 2020/0108912 A1* | 4/2020 | Daandels .................. | B64C 7/00 |
| 2021/0047047 A1* | 2/2021 | Ribeiro .................. | B64D 31/06 |
| 2024/0002048 A1* | 1/2024 | Wang ..................... | B64D 27/40 |

FOREIGN PATENT DOCUMENTS

CN    211766284 U   * 10/2020

* cited by examiner

*Primary Examiner* — Magdalena Topolski
*Assistant Examiner* — Shanna Danielle Glover
(74) *Attorney, Agent, or Firm* — Avek IP, LLC; Marshall Honeyman

(57) ABSTRACT

A system allowing for the connection of boom-mounted stabilizers on an inverted V-tail aircraft where hinge connections are provided between the bottom of each stabilizer and each boom, and an additional hinge connection is provided at the tops of each of the stabilizers at the apex where the two are connected. The movability of the stabilizers together to be joined at the apex avoids costs in engineering and manufacture.

21 Claims, 7 Drawing Sheets

INVERTED V-TAIL STABILIZER ASSEMBLY FOR AN AIRCRAFT

CROSS-REFERENCE TO RELATED APPLICATIONS

This application claims the benefit of U.S. Provisional Patent No. 63/383,423 filed on Nov. 11, 2022, the entire contents of which are herein incorporated by reference.

BACKGROUND OF THE INVENTION

1. Field

The disclosed embodiments relate generally to the field of aircraft aerodynamics. More specifically, the disclosed embodiments related to stabilizer configurations, structural arrangements, and assembly in Vertical Takeoff and Landing (VTOL) aircraft.

2. Description of the Related Art

Twin-boom aircraft have long existed. These aircraft normally include longitudinally-extending-spaced-apart substantially parallel auxiliary booms. Examples include the Fairchild C-119, the de Havilland Vampire T.11, and the Rutan Model 72 Grizzly. These conventional aircraft additionally typically have a central fuselage.

V-tail configurations for aircraft are also known in aircraft. For example, U.S. Pat. No. 11,319,055 issued to Decker et al. discloses an upright V-tail stabilizer arrangement utilized on a tilt-rotor aircraft.

U.S. Pat. No. 10,023,294 issued to VanBuskirk et al. discloses a V-tail stabilizer arrangement for a roto-craft wherein each of the two stabilizers is made to be rotatable on a pitch axis.

U.S. Patent Application Publication No. US2016/0052619 made by Gagliano shows an inverted V-tail aircraft including a stabilizer used on a single-jet forward-propulsion-only aircraft.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In some aspects, the techniques described herein relate to a system for connecting two aerodynamic structures, the system including: a first aerodynamic structure; a first flange arrangement extending from the first aerodynamic structure; a second aerodynamic structure; a second flange arrangement extending from the second aerodynamic structure; apertures defined into each flange in the first and second pairs of flanges, the apertures together defining a receiving area for one or more elongated fastening members, the one or more fastening members establishing a hinge point for the first aerodynamic structure relative to the second aerodynamic structure.

In some aspects, the techniques described herein relate to a system wherein the first aerodynamic structure is a boom and the second aerodynamic structure is a stabilizer.

In some aspects, the techniques described herein relate to a system wherein the stabilizer is angled relative to horizontal and vertical.

In some aspects, the techniques described herein relate to a system wherein the first and second aerodynamic structures are aerodynamic stabilizers.

In some aspects, the techniques described herein relate to a system wherein the first and second aerodynamic structures are angled stabilizers.

In some aspects, the techniques described herein relate to a system wherein the angled stabilizers are angled upwardly and inwardly and joined together by the one or more fastening members to create the hinge point.

In some aspects, the techniques described herein relate to a system wherein the second flange arrangement is a clevis which receives the first flange to make a connection.

In some aspects, the techniques described herein relate to a system wherein: the first flange arrangement includes two longitudinally spaced apart flanges each having apertures in a first hinge axis; and the second flange arrangement includes two corresponding flanges each having apertures in the first hinge axis.

In some aspects, the techniques described herein relate to a system wherein the first hinge axis is established by bolts on which the first and second flange arrangements rotate.

In some aspects, the techniques described herein relate to a system wherein the first and second aerodynamic structures are included in an inverted V-tail configuration.

In some aspects, the techniques described herein relate to an aircraft including: a first boom; a second boom laterally opposed to and spaced apart from the first boom; a first stabilizer angled upward and inwardly from a rear portion of the first boom to a stabilizer connection at an upper end of the first aerodynamic stabilizer; a second stabilizer angled upward and inwardly from a rear portion of the second boom to the stabilizer connection which is at an upper end of the second aerodynamic stabilizer; a first boom connection between the rear portion of the first boom and a lower end of the first stabilizer; a second boom connection between the rear portion of the second boom and a lower end of the second stabilizer; one or more of the: (i) stabilizer connection; (ii) first boom connection; or (iii) second boom connection are each made using one or more fasteners inserted along a common axis establishing a securement.

In some aspects, the techniques described herein relate to an aircraft wherein the securement includes the first boom connection.

In some aspects, the techniques described herein relate to an aircraft wherein the securement includes the second boom connection.

In some aspects, the techniques described herein relate to an aircraft wherein the securement includes the stabilizer connection.

In some aspects, the techniques described herein relate to an aircraft wherein the securement includes all of the first and second boom connections and the stabilizer connection.

In some aspects, the techniques described herein relate to an aircraft wherein the one or more fasteners are received apertures in flanges extending between the one or more of the: (i) stabilizer connection; (ii) first boom connection; or (iii) second boom connection.

In some aspects, the techniques described herein relate to an aircraft wherein the one or more fasteners establish a hinge point along the common axis for the one or more of the: (i) stabilizer connection; (ii) first boom connection; or (iii) second boom connection In some aspects, the techniques described herein relate to an aircraft wherein one of the: (i) stabilizer connection; (ii) first boom connection; or (iii) second boom connection includes: a first hinge and a first clevis hingedly mounted on a first bolt at a first longitudinal location; a second hinge and a second clevis hingedly mounted on a second bolt at a second longitudinal location: and the first and second bolts being on the common axis.

In some aspects, the techniques described herein relate to an aircraft wherein the first and second boom connections are both hinged connections, the first boom connection being made along the common axis and the second boom connection being made along a second independent common axis.

In some aspects, the techniques described herein relate to a method of manufacturing an aircraft, the method including: providing a first longitudinal boom laterally spaced apart from and substantially parallel to a second longitudinal boom; hingedly connecting a bottom of a first stabilizer to a first boom surface; hingedly connecting a bottom of a second stabilizer to a second boom surface; connecting a top of the first stabilizer to the top of the second stabilizer to form an inverted V-tail configuration.

BRIEF DESCRIPTION OF THE SEVERAL VIEWS OF THE DRAWINGS

Illustrative embodiments are described in detail below with reference to the attached drawing figures, which are incorporated by reference herein and wherein.

Figure 1A:
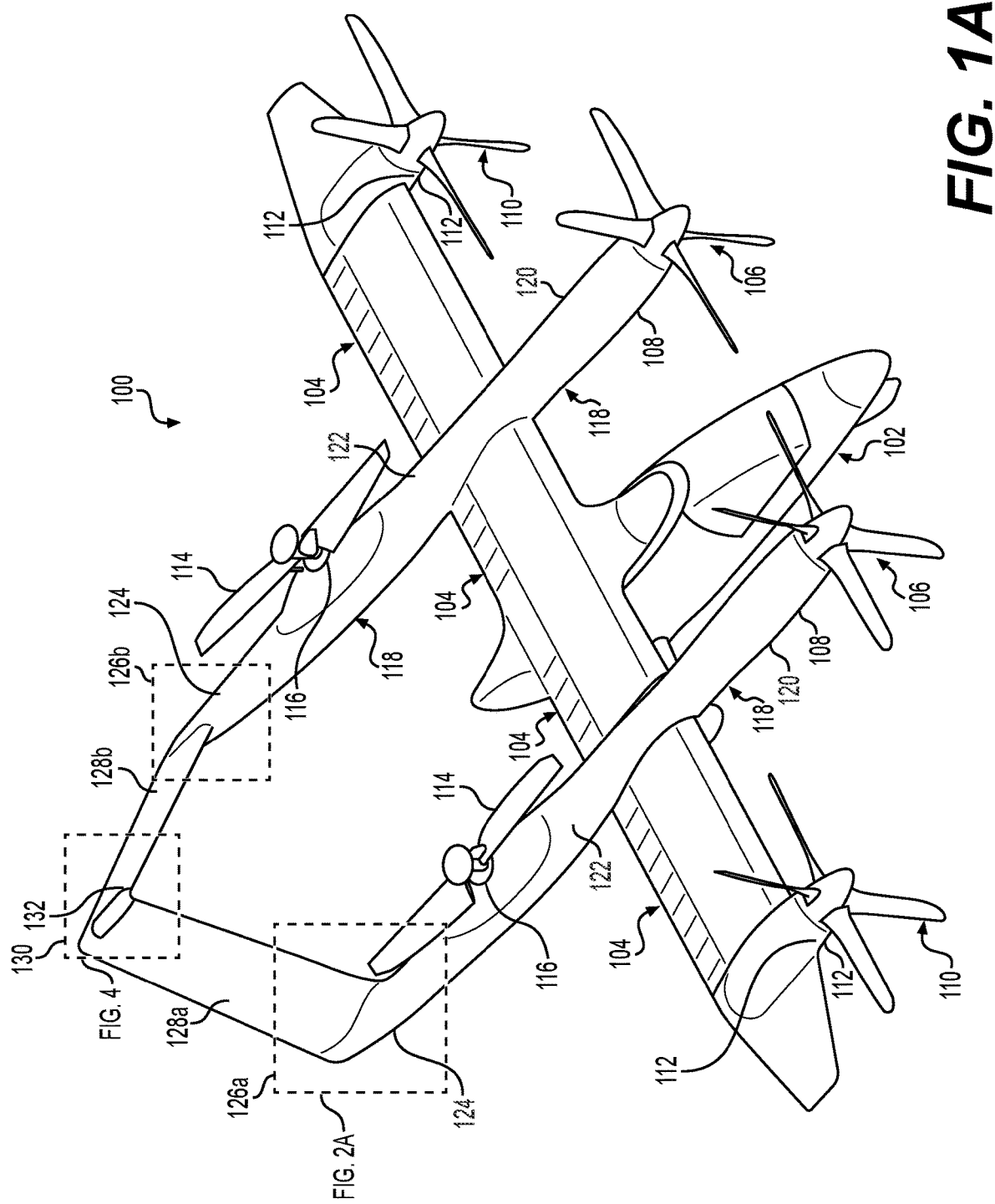
FIGS. 1A and 1B are perspective views of an aircraft on which an embodiment of the stabilizer system disclosed might be utilized.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc., described in one embodiment may also be included in other embodiments, but is not necessarily included. Thus, the technology can include a variety of combinations and/or integrations of the embodiments described herein.

Figure 1B:
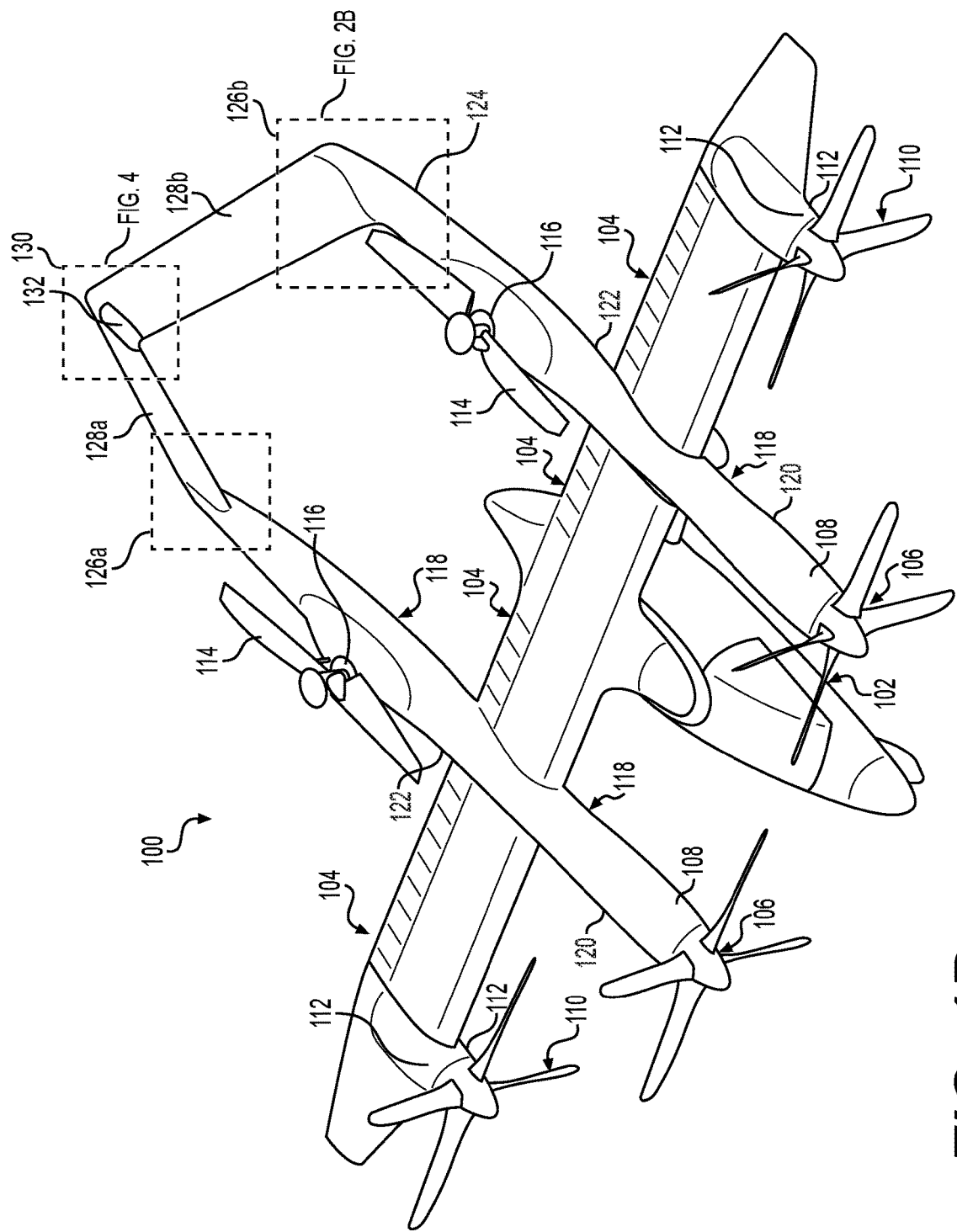

Embodiments provide an inverted V-tail system, and a method of assembling the system. FIG. 1 shows a perspective view showing incorporation of the disclosed embodiments into a VTOL aircraft 100.

VTOL aircraft 100 includes a center fuselage 102 mounted underneath a laterally extending wing 104. An inner pair 106 of laterally-spaced apart forwardly-directed propellers 106 are each operated by electric motors or engines 108, and an outer pair of laterally-spaced forwardly-directed propellers 110 are each operated by electric motors or engines 112. Motors/engines 108 are supported on the front end of laterally-spaced substantially-parallel booms 118. The terms "boom" or "booms" as used in this application should be interpreted as merely meaning some laterally existing structure on the aircraft and not be limited to any particular configuration, e.g., should not be considered to be longitudinally extending or have any other particular configuration unless specifically referenced as being so. In the FIG. 2A embodiment, each of booms 118 has a forward portion 120, an intermediate portion 122, and a rearward portion 124. Supported between the intermediate and rearward portions 122 and 124 on each boom 118 are a pair of lift propellers 114 each operated by a dedicated electric motor or engine 116.

Oppositely symmetrical mounting interfaces 126a and 126b exist on laterally opposite sides of the aircraft 100. Interfaces 126a and 126b each support upwardly and inwardly directed angled stabilizers 128a and 128b. The term "stabilizers" as used herein should be interpreted as any structure that has an aerodynamically stabilizing influence in longitudinal or directional flight dimensions (e.g., pitch, yaw). The term "stabilizer" should also be construed as allowing for fixed, adjustable, or even movable structures. Thus, this term should not be considered to specify any particular tail configuration and could be referenced to describe angled (e.g., a V-tail configuration), horizontal, vertical, or even non-planar stabilizing arrangements which contribute to longitudinal or directional control.

Figure 2A:
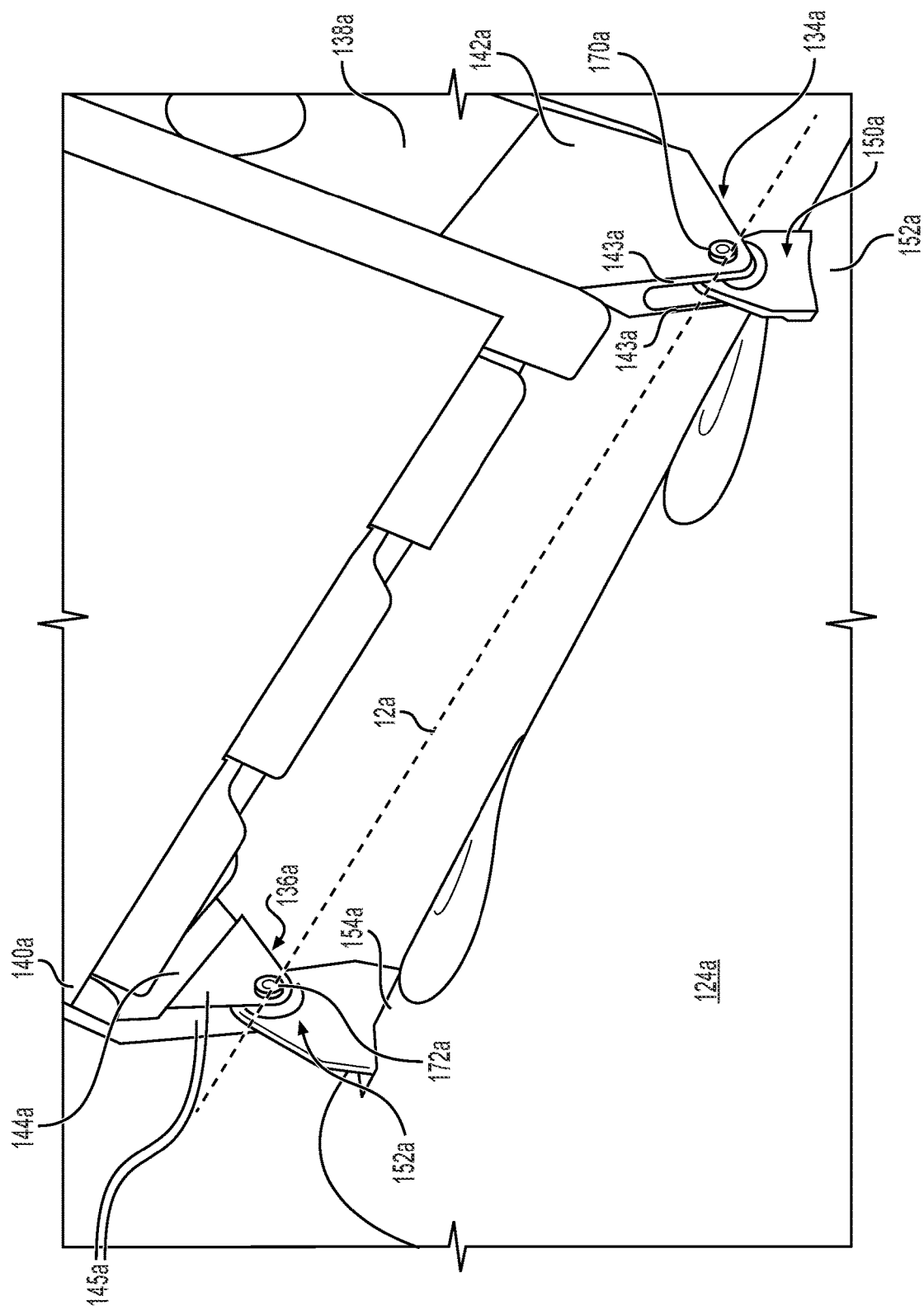
FIGS. 2A and 2B are breakout views at a boom to stabilizer interface 126b from FIGS. 1A and 1B according to embodiments.
Figure 2B:
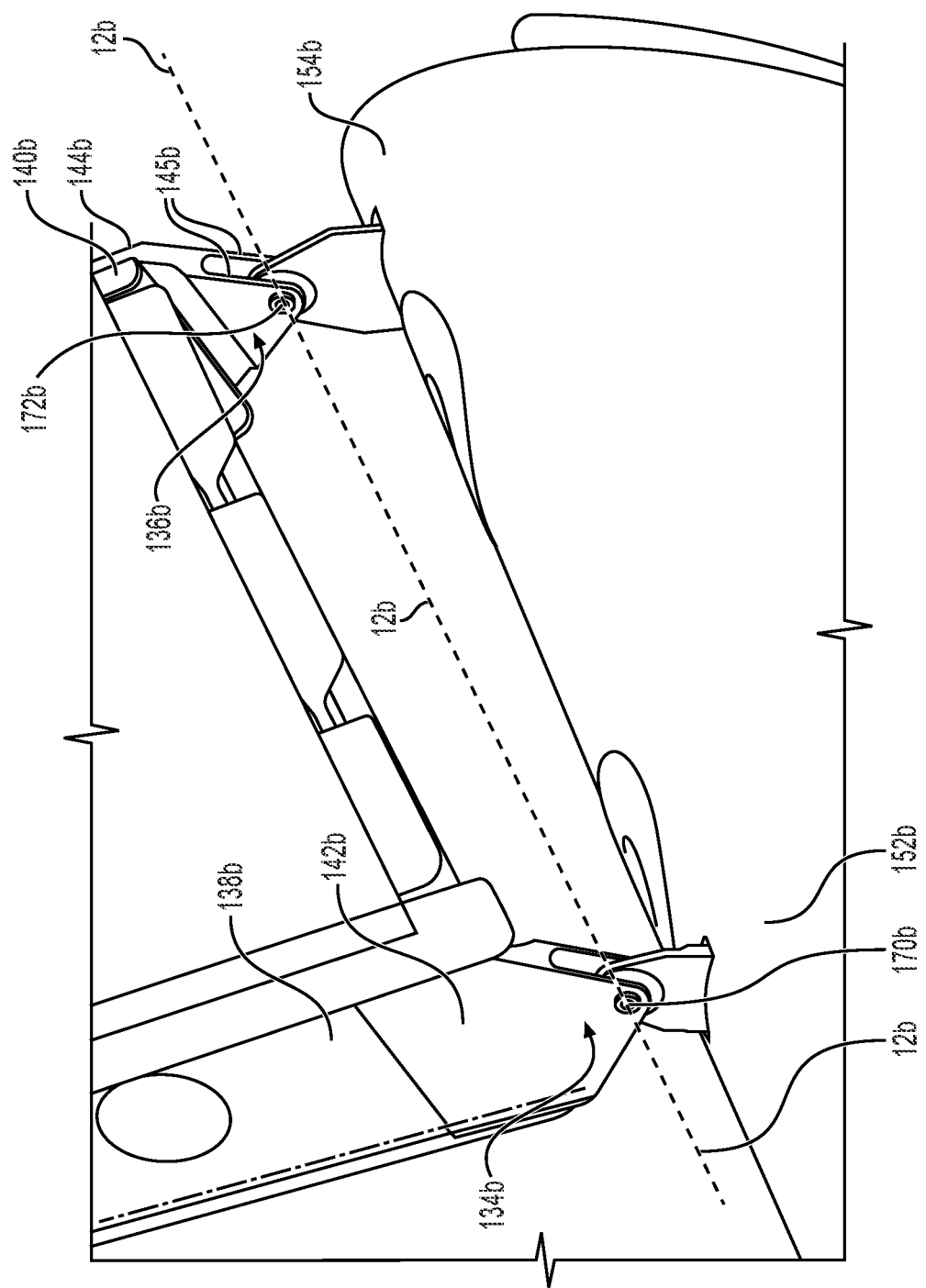

The specifics for interface 126a are shown in FIG. 2A, whereas the specifics for interface 126b are shown in FIG. 2B. The structures at interface 126a, in embodiments, would exist in lateral symmetry relative to interface 126b, as is represented in FIGS. 2A and 2B.

FIG. 2A shows a pair of front and rear clevises 134a and 136a. The clevises are both downwardly and outwardly angled. Each of clevises 134a and 136a include opposing flange pairs 143a and 143b. The clevises 134a and 136a are configured to be mounted on relatively forward and rearward frame members 138a and 140b. The securement can be made by welding or fastening at an attachment base (e.g., base portions 142a and 144a) which will be fixed to frame members 138a and 140a. Bases 142a and 144b are, in embodiments, configured for attachment to each frame member (e.g., frame members 138a and 140a) before installation. The flanges 143a and 145a of each of clevis pairs 134a and 136a have apertures formed there-though to establish complimentary transverse bore (e.g., transverse bores 147a and 148a) through each clevis. See FIG. 2A for locations of bores 147a and 148a FIG. 3 for a sectional view.

FIG. 2A also shows front and rear upwardly and inwardly directed lugs 150a and 152a, each mounted into and extending out from forward and rearward surfaces 154a and 156a located at the rear portion of the boom 124a (see FIG. 2A), which will be connected to the lower end of stabilizer 128a. Each of the front and rear lugs 150a and 152a are fixed within structures (e.g., ribs, etc.) inside the boom 124a being welded, fastened, or otherwise permanently fixed therein. Each of flange portions 162a and 164a includes a bore made therethrough (e.g., apertures 166a and 168a, see FIG. 3) configured to receive a fastener (e.g., pins or bolts 170a and 172a).

Figure 3:
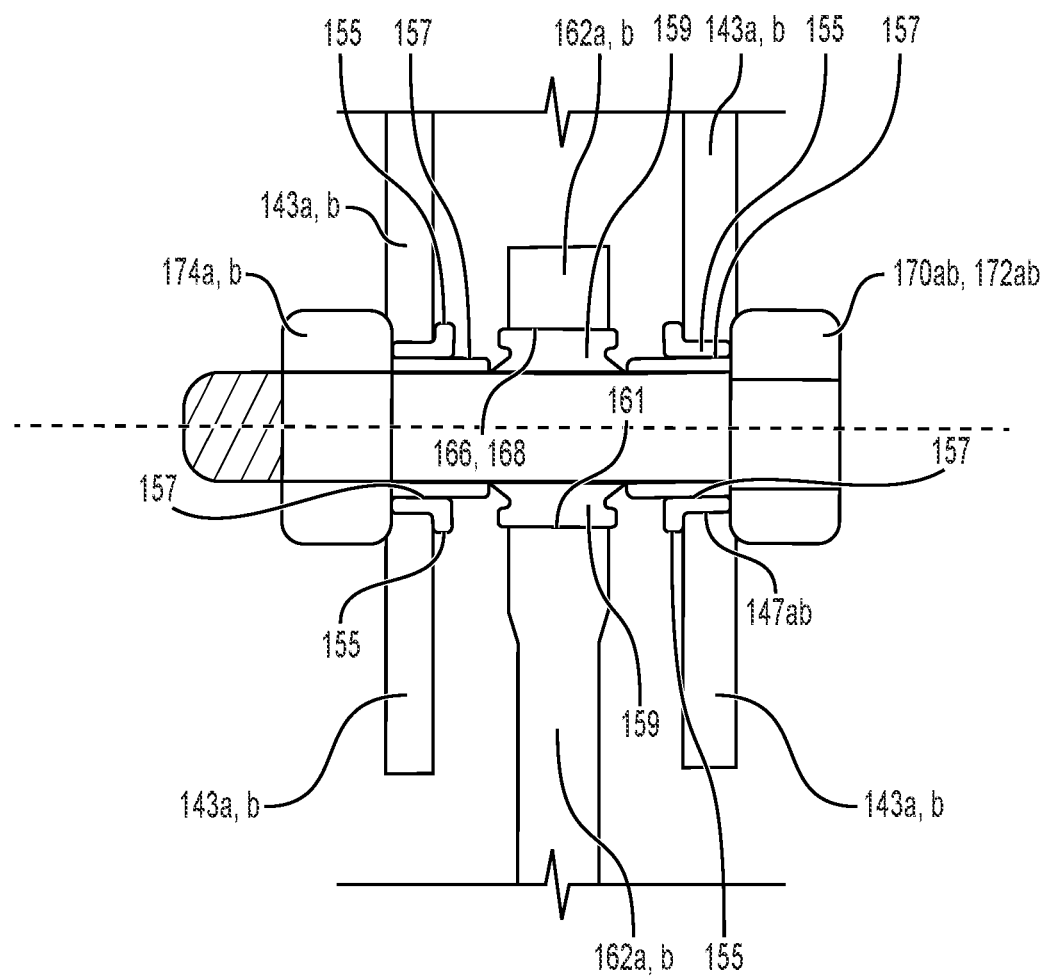
FIG. 3 is a sectional view taken at a connection point between the boom and stabilizer in interface 126b.

Bolts 170a and 172a shown in FIG. 2A are used to make the connections between the stabilizer 128a and the rear portions 124a of boom 118a at each of interface 126a shown in FIG. 3. Referring to FIGS. 2 and 3, bolt 170a is inserted through the transverse bores 147a made through flanges 143a of clevis 134a, and also through aperture 166a made through flange 162a of lug 150a (see FIG. 3). Also shown in FIG. 3, a nut 174a is used to make the securement between the clevis 134a and the lug 150a. The same arrangement is used to secure clevis 136a and lug 152a together using bolt 172a. Referring to FIG. 2A, it can be seen that both bolts 170a and 172a, after being installed, share a common axis 12a at interface 126a.

The interfaces 126a and 126b between the booms and the lower stabilizers are laterally symmetrical relative to the center axis of the aircraft.

The details regarding symmetrical interface 126b are shown in FIG. 2B. FIG. 2B shows a pair of front and rear clevises 134b and 136b. Each of clevises 134b and 136b are downwardly and outwardly angled and include opposing flange pairs 143b and 145b. Clevises 134b and 136b are configured to be mounted on relatively forward and rearward frame members 138b and 140b (e.g., by welding or fastening) at an attachment base (e.g., base portions 142b and 144b) which will be fixed to the frame members 138b and 140b. Bases 142b and 144b are, in embodiments, configured for attachment to each frame member (e.g., frame members 138b and 140b) before installation. The flanges 143b and 145b of each of clevis pairs 134b and 136b have apertures formed there-though to establish complimentary transverse bore (e.g., transverse bores 147b and 148b shown in FIG. 3) through each clevis. See FIG. 2B for locations of bores 147b and 148b and see FIG. 3 for a sectional view.

FIG. 2B also shows front and rear upwardly and inwardly directed lugs 150b and 152b, each mounted into and extending out from forward and rearward surfaces 154b and 156b located at the rear portion of the boom 124b (see FIG. 2B), which will be connected to the lower end of stabilizer 128b. Each of the front and rear lugs 150b and 152b are fixed within structures (e.g., ribs, etc.) inside the boom 124b being welded, fastened, or otherwise permanently fixed therein. Each of flange portions 162b and 164b includes a bore made therethrough (e.g., apertures 166b and 168b, see FIG. 3) configured to receive a fastener (e.g., pins or bolts 170b and 172b).

Bolts 170b and 172b shown in FIG. 2B are used to make the connections between the stabilizer 128b and the rear portions 124b of boom 118b at each of interface 126b shown in FIG. 3. Referring to FIGS. 2 and 3, bolt 170b is inserted through the transverse bores 147b made through flanges 143b of clevis 134b, and also through aperture 166b made through flange 162b of lug 150b (see FIG. 3). Also shown in FIG. 3, a nut 174b is used to make the securement between the clevis 134b and the lug 150b. The same arrangement is used to secure clevis 136b and lug 152b together using bolt 172b. Referring to FIG. 2B, it can be seen that both bolts 170b and 172b, after being installed, share a common axis 12b at interface 128b.

FIG. 3 reveals that each of clevises 134a, 134b, 136a, and 136b has clamp up sleeves 155 mounted inside clevis bores 147 in each of the opposing flanges 134. Inside the clevis flange pair 134, the bolt also passes through the lug 162. More specifically, the bolt 170 is received through a spherical bearing 159 installed and fixed inside the aperture 161 in the lug.

Thus, the arrangement at interface 126b shown in FIG. 3 creates a hinge axis 176 on which the stabilizer 128b will rotate relative to the boom on which it is installed. This helps with manufacture. More specifically, the freedom of movement eases assembly because a conventional fixed arrangement normally requires careful engineering to connect two joined parts together at a common point or line (e.g., common line 178 in FIG. 1). Conventionally, this is a difficult process requiring precise tolerances because errors will prevent parts from matching up.

Here, because the stabilizer design requires a matching up at an apex 132, the creation of hinge axis 12a in FIG. 2A and the complementary hinge axis 12b in the symmetrical arrangement in FIG. 2B eliminate the need for precise engineering to make the structural components match up. (Again, the details at interface 126a and 126b are laterally symmetrical).

Figure 4:
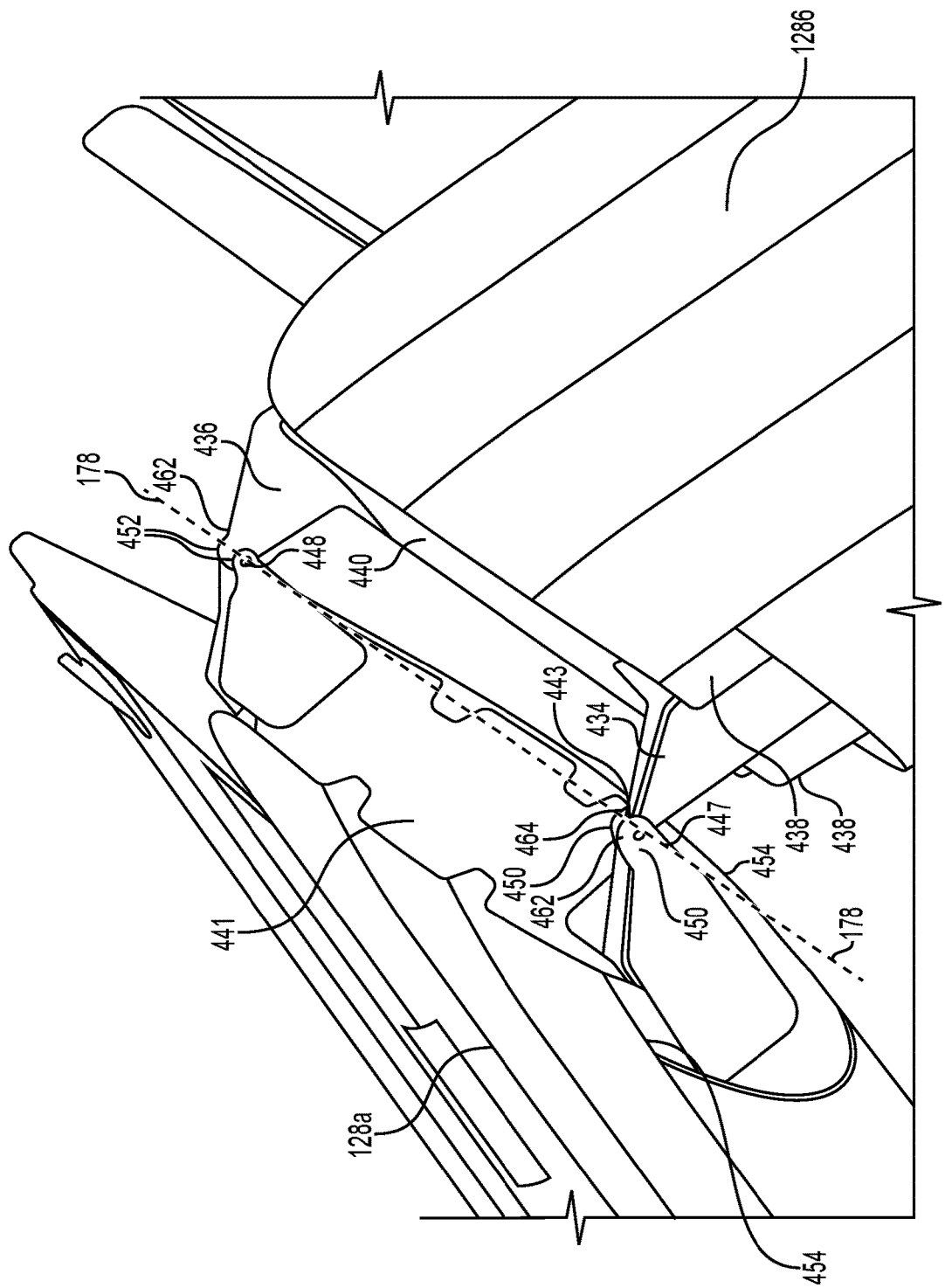
FIG. 4 is a breakout view at a stabilizer-to-stabilizer interface 130 from FIG. 1.
Figure 5:
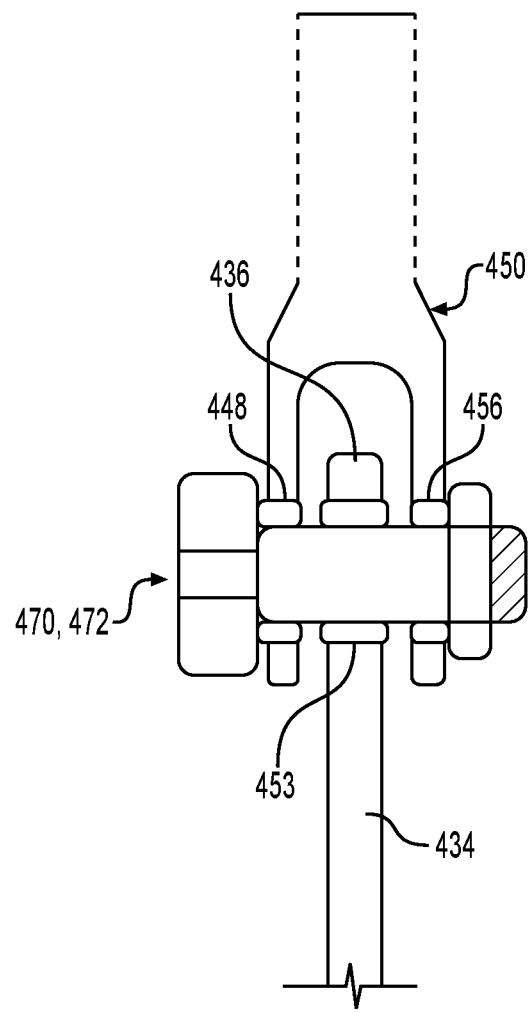
FIG. 5 is a sectional view taken at a connection point in the stabilizer-to-stabilizer interface 130.

The match-up point at apex 132 is accomplished at interface 130 where each of the symmetrical angled stabilizers 128a and 128b converge upward to meet, and where the upper end of each is connected to the other. Referring to FIG. 4, a pair of front and rear upwardly and inwardly directed lugs 434 and 436 are configured to be mounted into internal stabilizer structures including a relatively forward frame member 438 and a second identical frame member (not shown but identical). The lugs 434 and 436 are incorporated into stabilizer internal structures and protrude out from an end rib 440 which acts as a stabilizer end cap (top). The connections between the lugs 434 and 436, internal stabilizer structures and rib 440 can be made by welding or fastening or some other method. Lugs 434 and 436 also includes flange portions 443 and 462 each having an aperture (e.g., transverse bores 447 and 453) made therethrough (see FIG. 5 for locations of lug 447).

The arrangement on top of stabilizer 128a on the left-hand side of interface 130 is shown in FIG. 4. This arrangement includes upwardly and inwardly angled clevis arrangements 450 and 452. Clevis 450 is mounted onto a first frame member 454 and clevis 452 is mounted onto a second frame member (not shown, but symmetrical to the first frame member 454, just on the other side of the stabilizer 128a). The lugs 450 and 452 are also mounted around an end cap rib 441. The lugs can be fastened or welded to the frame members and at the ends of the end cap rib 441. Clevis 450 and clevis 452 also include flange portions 462 and 464 each having apertures made therethrough, e.g., transverse bores 448 and 455 in both flanges on each clevis (see FIG. 5 for locations of apertures 448 and 455). It should be noted that the connection between clevis 452 and flange 436 would be executed in the same manner.

Bores 447 and 448 are matched up and a bolt 470 inserted through them to secure the flanges 443 and 463 together. Another bolt 472 (see FIG. 5) is received through bores 453 and 455 to make the same securement using bolts secured by nuts. The apertures made through each flange in each clevis arrangements 450 and 452 include bushings, as does the aperture made through The fastening of bolts 470 and 472, which are axially aligned, establishes a hinge point about axis 178 (see FIG. 1). The bolts 470 and 472 also make the necessary connection along a common line established at interface 130 between the tops of stabilizers 128a and 128b. The hinge point established about axis 178 is not active during flight but is useful in allowing for more liberal manufacturing tolerances of parts.

Two independently connectable stabilizer portions are established by the connection arrangements at interfaces 126a, 126b, and 130. Each interface creates a hinge point allowing for rotation during assembly, but once all three interface connections are made, the vertical stabilizers are stable and locked in place.

In terms of assembly during manufacture, the arrangements above, in embodiments, can involve starting by assembling the bolts into the dual clevis/flange connections at each of the boom-to stabilizer interfaces 126a and 126b (see FIGS. 2A and 2B). These connections between the rear surfaces 124 of each of the first and second booms and the bottoms of each of the stabilizers 128a and 128b make each hingedly rotatable towards the final connection being made between the upper portions of each of the stabilizers 128a and 128b at connection point at the apex 132 at interface 130. These upper portions of the stabilizers are easily made using the bolt connections provided, thus completing the formation of the inverted V-tail configuration.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

The invention claimed is:

1. An aircraft comprising:
a first boom;
a second boom laterally opposed to and spaced apart from the first boom;
a first stabilizer angled upward and inwardly from a rear portion of the first boom;
a second stabilizer angled upward and inwardly from a rear portion of the second boom towards an upper end of the first stabilizer;
a stabilizer connection interface established at the upper ends of the first and the second stabilizers;
a first boom connection between the rear portion of the first boom and a lower end of the first stabilizer, the first boom connection configured to enable the first stabilizer to swing upwards towards the stabilizer connection interface;
a second boom connection between the rear portion of the second boom and a lower end of the second stabilizer;
wherein the first and second boom connections together allow the first and second stabilizers to swing freely upwards to meet at an apex at the stabilizer connection interface to establish a bolt connection on an axis that is substantially parallel relative to the first and second boom connections;
wherein each of the: (i) stabilizer connection; (ii) first boom connection; or (iii) second boom connection includes:
a first hinge and a first clevis hingedly mounted on a first bolt inserted along a common axis at a first longitudinal location wherein the first bolt is configured to secure the respective elements together;
a second hinge and a second clevis hingedly mounted on a second bolt at a second longitudinal location; and
the first and second bolts being on the common axis.

2. The aircraft of claim 1, wherein the first and the second bolt secure the first boom connection.

3. The aircraft of claim 1, wherein the first and the second bolt secure the second boom connection.

4. The aircraft of claim 1, wherein the first and the second bolt secure the stabilizer connection.

5. The aircraft of claim 1, wherein the first and the second bolt secure all of the first and second boom connections and the stabilizer connection.

6. The aircraft of claim 1, wherein the first and the second bolt are received into apertures in flanges extending between the one or more of the: (i) stabilizer connection; (ii) first boom connection; or (iii) second boom connection.

7. The aircraft of claim 6, wherein the first and the second bolt establish a hinge point along the common axis for the one or more of the: (i) stabilizer connection; (ii) first boom connection; or (iii) second boom connection.

8. The aircraft of claim 1, wherein the first and second boom connections are both hinged connections, the first boom connection being made along the common axis and the second boom connection being made along a second independent common axis.

9. A method of manufacturing an aircraft, the method comprising:
providing a first longitudinal boom laterally spaced apart from and substantially parallel to a second longitudinal boom;
hingedly connecting a bottom of a first stabilizer to a first boom surface;
hingedly connecting a bottom of a second stabilizer to a second boom surface wherein the first stabilizer and the second stabilizer are symmetrical;
rotating the first and second stabilizers upward to meet at a connection interface to connect a top of each of the first and second stabilizers to establish a bolt connection at an apex for an inverted V-tail configuration.

10. The method of claim 9, comprising disposing a forward connection hinge point and a rearward connection hinge point onto the first boom surface for hingedly connecting the bottom of the first stabilizer to the first boom surface.

11. The method of claim 10, wherein the forward connection hinge point connects to a leading edge of the first stabilizer and the rearward connection hinge point connects to a trailing edge of the first stabilizer.

12. An aircraft comprising:
a first rearwardly extending boom;
a second rearwardly extending boom;
a first stabilizer having a first hinged arrangement for connecting directly to the first boom; the first hinged arrangement including independent forward and rearward connection hinge points, the forward and rearward connection hinge points each configured to rotate on a common axis which is generally parallel with respect to the first boom;

a second stabilizer being substantially symmetrical relative to the first stabilizer, the second stabilizer having a second hinged arrangement for connecting directly to the second boom, the second hinged arrangement including independent forward and rearward connection hinge points, the forward and rearward connection hinge points each configured to rotate on a common axis which is generally parallel with respect to the second boom; and a stabilizer hinged arrangement connecting a top of the first stabilizer to a top of the second stabilizer to form an inverted V-Shape, and connection between the top of the first stabilizer and the top of the second stabilizer causes the first and the second stabilizers to lock into the inverted V-shape.

13. The aircraft of claim 12, wherein the stabilizer connection includes the independent forward and rearward connection hinge points, the forward and the rearward connection hinge points each configured to rotate on the common axis which is generally parallel with respect to the first boom and the second boom.

14. The aircraft of claim 12, wherein the stabilizer connection generally forms an apex of the inverted V-Shape.

15. The aircraft of claim 12, wherein the forward connection hinge point is disposed at a forward edge of the stabilizer and the rearward connection hinge point is disposed at a rearward edge of the stabilizer.

16. The aircraft of claim 12, wherein the forward and the rearward connection points each include a clevis hingedly mounted to a bolt.

17. The aircraft of claim 16, wherein the bolt has a shaft which is aligned with the common axis and the clevis is configured to rotate about the shaft.

18. The aircraft of claim 12, wherein the forward connection hinge point and the rearward connection hinge point of each of the first and the second hinged arrangements each include a lug which extends from the first or the second rearwardly extending boom.

19. The aircraft of claim 16, wherein the clevis includes a flange pair and the bolt passes through the flange pair and the lug to connect the lug and the clevis.

20. The aircraft of claim 18, wherein the lug is permanently fixed to the first rearwardly extending boom or the second rearwardly extending boom.

21. The aircraft of claim 17 comprising a spherical bearing wherein the shaft of the bolt is received through the spherical bearing configured in between flanges of the flange pair such that a lug rotates relative to the bolt.

* * * * *